(12) United States Patent
Neuberger

(10) Patent No.: US 6,928,213 B2
(45) Date of Patent: Aug. 9, 2005

(54) DIRECTIONALLY ILLUMINATING EMERGENCY SYSTEM

(75) Inventor: Wolfgang Neuberger, F.T. Labuan (MY)

(73) Assignee: Ceram Optec Industries, Inc., East Longmeadow, MA (US)

( * ) Notice: Subject to any disclaimer, the term of this patent is extended or adjusted under 35 U.S.C. 154(b) by 70 days.

(21) Appl. No.: 10/356,941

(22) Filed: Feb. 3, 2003

(65) Prior Publication Data

US 2004/0151430 A1 Aug. 5, 2004

(51) Int. Cl.[7] .................................................. G02B 6/44
(52) U.S. Cl. ........................... 385/31; 385/28; 362/551; 362/480
(58) Field of Search ...................... 385/31, 28; 362/551, 362/480

(56) References Cited

U.S. PATENT DOCUMENTS

| | | | |
|---|---|---|---|
| 4,029,994 A | 6/1977 | Iwans | |
| 4,263,640 A | 4/1981 | Altman | |
| 4,347,499 A | 8/1982 | Burkman, Sr. et al. | |
| 4,376,966 A | 3/1983 | Tieszen | |
| 4,389,085 A | 6/1983 | Mori | |
| 4,401,050 A | 8/1983 | Britt et al. | |
| 4,521,839 A | 6/1985 | Cook et al. | |
| 4,794,373 A | 12/1988 | Harrison | |
| 5,321,593 A | 6/1994 | Moates | |
| 5,345,531 A * | 9/1994 | Keplinger et al. | 385/102 |
| 5,961,072 A | 10/1999 | Bodle | |
| RE36,642 E | 4/2000 | Ziadi | |
| 6,183,102 B1 | 2/2001 | Mortz et al. | |
| 6,237,266 B1 | 5/2001 | Tassey et al. | |
| 6,382,824 B1 * | 5/2002 | Prasad et al. | 362/551 |
| 6,450,677 B1 * | 9/2002 | Knauer et al. | 362/551 |

* cited by examiner

Primary Examiner—John R. Lee
Assistant Examiner—Zia R. Hashmi
(74) Attorney, Agent, or Firm—Bolesh J. Skutnik; B J Associates

(57) ABSTRACT

An illuminating emergency device or system having indicators that effectively communicate escape routes in highly dangerous industrial environments and commercial safety systems is disclosed. An optical fiber is manufactured in a way to emit controlled and patterned radiation along its length. This is realized by coupling a predefined amount of radiation guided by the fiber per length unit out of the fiber core into the cladding and jacket. The present invention advances a concept of partially illuminating fibers, especially partially illuminating fibers providing one or more illumination colors and illuminating fibers capable of changing illumination color to indicate the status of an emergency route. The invention further provides the inclusion of novel fiber lasers for illumination purposes and methods to obtain a relatively homogeneous illumination at the diffusion sites, as well as discreet illumination patterns. In other embodiments, multiple fibers are provided with discreet illumination sites to provide a directional pattern. Further embodiments include staggered or pattern pulsing of one or more radiation sources to give the impression of a traveling or chasing light pulse to further enhance directional information.

23 Claims, 5 Drawing Sheets

5a

5b

5c

DIRECTIONALLY ILLUMINATING EMERGENCY SYSTEM

BACKGROUND OF THE INVENTION

1. Field of the Invention

This invention relates to emergency illumination systems, particularly those having indicators that effectively communicate an exit route. It also relates to illuminating fibers displaying one or more illumination colors.

2. Information Disclosure Statement

In many situations and environments, it is necessary to provide emergency systems that direct persons to exits or other areas of safety. Areas such as airplanes, industrial environments and theatres all require systems to direct persons in the event of a power outage, fire, or other emergency. Such systems must have certain characteristics to be effective. They must be highly visible, both in darkness and in situations where smoke or other environmental conditions reduce visibility. They must also be reliable and able to produce illumination regardless of the state of the main power supply. Finally, they must be able to communicate escape routes effectively and unambiguously to users. Many systems have been utilized and promoted in the prior art.

The following patents involve the use of lamps or incandescent bulbs as illumination sources in pulsed lighting systems. U.S. Pat. No. 4,347,499 describes an emergency guidance system having a plurality of discernable means, which are electronically interconnected to provide a sequentially pulsed system. The system provides a moving light pattern to direct occupants to a safe exit in an airplane or public building. The lighting source is a low voltage lamp or high intensity bulb.

U.S. Pat. No. 4,029,994 describes an emergency lighting system for indicating the direction of emergency exits of an airplane or other passenger carrier. The flashing light system incorporates battery powered electronic flash lamps along the aisle of a carrier and a means to provide a stroboscopic sequential firing of the lamps to create the illusion of a moving light beam. The preferred light source is a gas discharge type of tube or lamp.

U.S. Pat. No. 4,794,373 describes a lighting strip apparatus for visually guiding the occupants out of a structure. The apparatus is comprised of a carpet overlying the floor and a flexible lighting strip positioned underneath the carpet. A small incandescent bulb is the described light emitting means. The light-emitting means may be sequentially activated to impart a visual direction signal to a viewer.

The above systems utilize lamps or incandescent bulbs as an illumination means. These have limitations in hazardous areas and have all the complications associated with replacement and cleaning of a lamp type system.

Other patents concern the use of phosphorescent/luminescent materials as an emergency directional means. U.S. Pat. No. 4,401,050 describes a phosphorescent and tactile escape route indicator that can be followed by a person in complete darkness or where visibility is impaired. In a preferred embodiment the indicator is a tape having formed there-on protruding direction indicia, such as an arrow or arrowhead. The indicia contain a phosphorescent material capable of emitting a glow immediately after loss of conventional lighting.

U.S. Pat. No. 5,961,072 describes an emergency lighting system comprised of photoluminescent strips mounted on the floor of a vehicle, such as an aircraft. A channel extrusion is secured to the floor and a two-layer photoluminescent strip is held between the channel and a transparent cover. The double layer increases light output. In a preferred embodiment a photoluminescent dye or ink of a different color from the photoluminescent strip is used to mark words or pictograms onto the strip.

U.S. Pat. No. 6,237,266 describes an evacuation route indicator that includes a carpeted strip having direction-indicating indicia formed thereon. The indicia are a photo-luminescent material and are formed either recessed or raised in relation to the carpet surface. Indicia may include a series of geometric shapes of increasing or decreasing size or other symbols which represent direction.

Although no electricity is required to operate the previously described set of inventions, phosphorescent materials have a limited functional period. They also continue to point to exit routes that may in fact be blocked, by fire or other hazards. The static indicator cannot change color, and they cannot provide a motion or strobe effect.

U.S. Pat. No. 6,183,102 describes a transparent tubular member containing a volume of long persistence phosphorescent material. The tubular member is flexible and preferably only coated on the inside with the phosphorescent material. In a preferred embodiment a plurality of light emitting diodes at spaced intervals in the interior of the tubular member intermittently flash to recharge the luminescent capability of the phosphorescent base material. This system overcomes the problem of a limited functional period, but still continues to point to exit routes that could be blocked; it cannot change color, and cannot provide a motion or strobe effect. It also has the problems associated with using light bulbs.

U.S. Reissue Pat. No. 36,642 describes a fiber-optic lighting system designed to transmit light from a remote light source to individual light fixtures. Elongated fiber optic light guides extend out to light fixtures throughout an airplane cabin. The fixtures are comprised of reflectors, lenses and globes and do not contain lamps. The light guides are used for valance light fixtures, reading lights, and floor strips for directional emergency lighting. The means to distribute light out of the fiber are not integral to the fiber and the fixtures are susceptible to damage. The preferred light source is a high intensity discharge lamp, such as a xenon metal halide lamp. These give off relatively high amounts of heat and may not be suitable in a potentially combustible or explosive environment.

U.S. Pat. No. 4,521,839 describes a strip lighting system comprising a string of electrically connected light bulbs contained within a flexible waterproof tube. The bulbs are removable so that they can be individually replaced if necessary. U.S. Pat. No. 4,376,966 describes a strip light comprised of a series of electric lamps spaced along the interior of a flexible vinyl tube. The tube is disposed within a channel-like mounting bracket having a restricted entrance through which the tube can be viewed. Although the flexible tubing systems described can resist a wet environment, they still use an electrical lead to power the bulbs, which could be hazardous if exposed to potentially explosive environments. They also have the problems associated with replacing bulbs that burn out and they cannot produce a chasing effect.

The following patents disclose chasing light systems. U.S. Pat. No. 5,321,593 describes a strip lighting system using light emitting diodes. The system can produce a static lighting effect or a chasing light effect. The system applies reverse voltage to the LED's to achieve a four-channel chase with only three conductors. U.S. Pat. No. 4,263,640 describes a lighting device for producing a chasing light effect. The invention comprises one or more flexible transparent tubes which house a star connected network of miniature light sources. The light sources are disposed in a string array. A sequencer drives the star connected network of miniature light sources. The two chasing light systems described above use electrical bulbs that are inappropriate in challenging environments. The systems also have all the problems associated with changing and maintaining a bulb based illumination system.

U.S. Pat. No. 4,389,085 describes a lighting system utilizing sunlight. In a preferred application, sunlight or an artificial light source such as a laser beam, is passed through an optical transmission line. In a preferred application, one or more optical fibers having light diffusion sites along the length illuminate an emergency exit or staircase. The diffusion sites may be a recess in the cladding, a hole in the cladding filled with an optically transparent medium or a transparent optical element. In another application, special artificial light sources such as laser generators capable of emitting various colored beams are provided so that the light may be flashed or changed in color to communicate information. The described system uses a fiber with a single cladding and illumination is by passive lighting (sunlight). The light source is not integral to the fiber and there is no means to indicate path direction. There is further no means to easily change the emitted wavelength; the use of a prism in selecting wavelengths makes it difficult to switch wavelengths and adds complexity to the system. Also, there are no means to produce a chasing effect. Furthermore, the effective lengths of fiber that can be used is restricted. This system is also disadvantageous in places that do not receive a sufficient amount of sunlight, in environments such as airplanes that have insufficient surface area to accommodate large arrays of sunlight collectors, or where conditions may be present that could damage exposed sunlight collectors.

There remains a need for an illuminating emergency device that has direction indicating elements and is capable of emitting light of different colors to communicate exit status. It would also be useful to have an illuminating emergency device that is side pumped for greater energy input, double cladded to utilized fiber laser elements, and possessing light emitters that are integral to the fiber to enhance reliability.

OBJECTIVES AND BRIEF SUMMARY OF THE INVENTION

It is an object of the present invention to provide an illuminating emergency device or system capable of guiding people to safety in a potentially hazardous environment.

It is another object of the present invention to provide an illuminating optical fiber system that includes elements that indicate an absolutely defined direction.

It is still another object of the present invention to provide an illuminating emergency device based on an active element such as a fiber laser rather than a passive element.

It is a further object of the present invention to provide an illuminating emergency device having a strobe or chasing light effect.

It is yet another object of the present invention to provide an optical fiber or an optical fiber system with means to guide radiation at different wavelengths and means to express illumination of multiple colors and blends thereof.

Briefly stated, the present invention provides for an illuminating emergency device or system having indicators that effectively communicate escape routes in highly dangerous industrial environments and commercial safety systems. An optical fiber is manufactured in a way to emit controlled and patterned radiation along its length. This is realized by coupling a predefined amount of radiation guided by the fiber per length unit out of the fiber core into the cladding and jacket. The present invention advances a concept of partially illuminating fibers, especially partially illuminating fibers providing one or more illumination colors and illuminating fibers capable of changing illumination color to indicate the status of an emergency route. The invention further provides the inclusion of novel fiber lasers for illumination purposes and methods to obtain a relatively homogeneous illumination at the diffusion sites, as well as discreet illumination patterns. In other embodiments, multiple fibers are provided with discreet illumination sites to provide a directional pattern. Further embodiments include staggered or pattern pulsing of one or more radiation sources to give the impression of a traveling or chasing light pulse to further enhance directional information.

The above and other objects, features and advantages of the present invention will become apparent from the following description read in conjunction with the accompanying drawings, in which like reference numbers in different drawings designate the same elements.

DETAILED DESCRIPTION OF PREFERRED EMBODIMENT

Today's state of the art optical fibers have found broad application in the fields of telecommunication, optical inspection, medical therapy, and laser applications. The fabrication processes are well understood and optical fibers are manufactured in large quantities at high quality providing extended lifetimes.

The present invention incorporates the ability to couple the radiation of high power laser sources into optical fibers by applying specially manufactured optical fibers for delineating escape routes in highly dangerous industrial environments and commercial safety systems. Typical locations where the present invention would be useful include sea based oil platforms, chemical plants, automotive factories, coal mines, sports arenas, trains, airplanes, commercial watercraft, and so on.

In order to organize an evacuation or direct access to safety equipment in an emergency situation, it is prudent to mark the path in a unique way including an absolute direction visible even in extreme situations. Illuminating fibers are an optimal solution to this problem, since they are not necessarily dependant on local electricity, do not have high voltage switches, and produce little if any heat. They are especially advantageous in environments containing highly flammable materials, in that electrical power sources and connections can be positioned in a remote location away from the flammable environment, obviating the risk of electrical connections or switching mechanisms triggering combustion or an explosion.

Emergency illumination devices for escape path routing should have homogeneous illumination along their length for uniform visibility. The problem of obtaining a homogeneous illumination is solved in an elegant way by the present invention with the application of a fiber laser as the illumination source. A preferred fiber laser device is discussed later in this section. Since the device described in this invention does not include a conventional output surface, it can be pumped from the sides or even both ends. An even greater improvement can be achieved by the inclusion of amplifier elements along the fiber path.

An unmistakable direction indicator is even more significant. Without a clearly marked direction, a person may not know which end of an illuminating path to move towards. It is also preferable that a unitary device produce illuminations of different colors. To achieve a color mixture, either several fibers, each carrying one wavelength or one fiber providing a higher complexity to guide more than one wavelength can be applied. Incorporating color into an illuminating emergency device allows it to communicate more information to the user.

Figure 1:
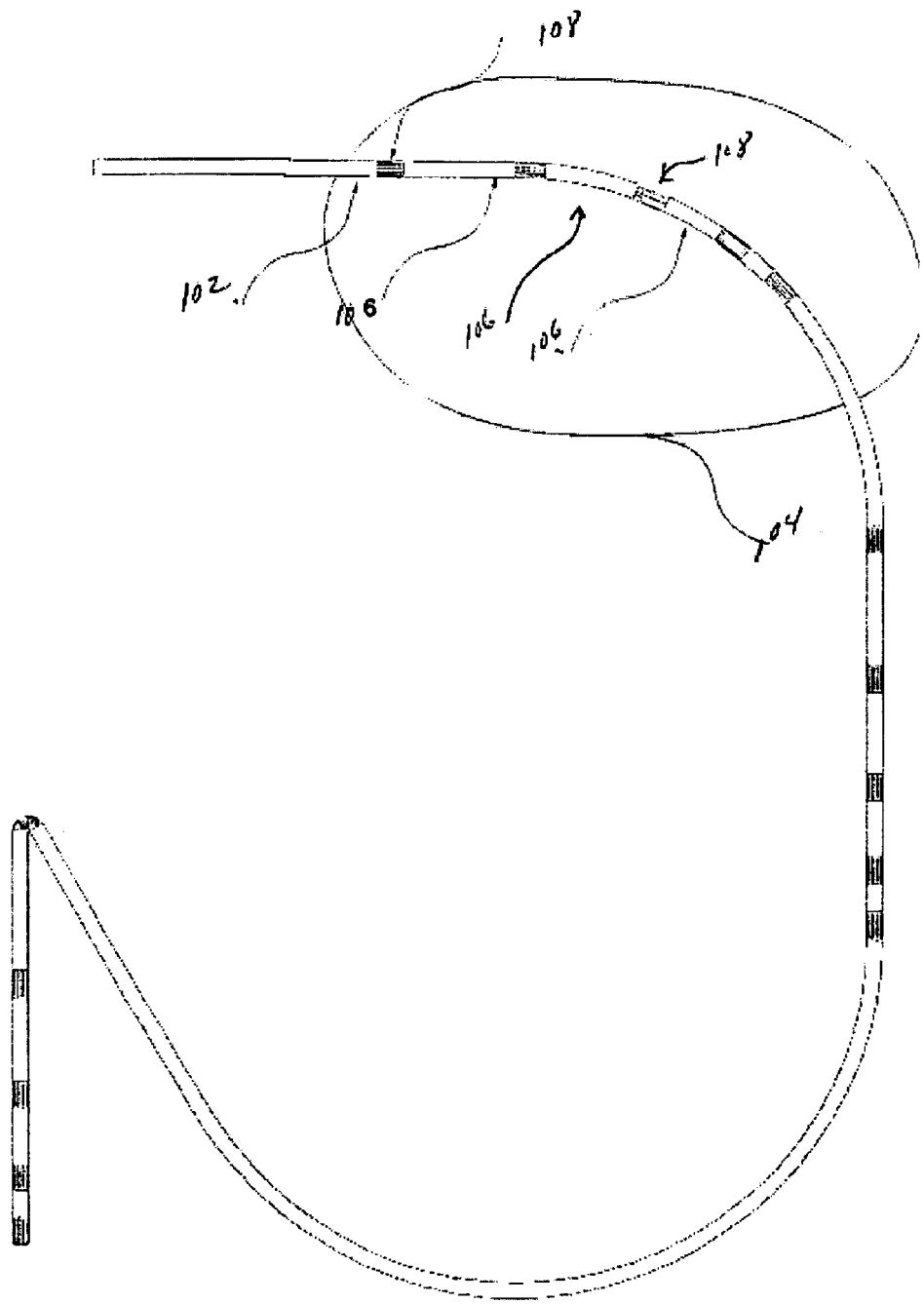
FIG. 1 illustrates a preferred embodiment of the present invention.

A preferred embodiment of the present invention is illustrated in FIG. 1. An illuminating emergency device consists of an optical fiber having uniformly illuminating elements 102 which occupy the largest part of the fiber length. This general illumination is needed to define a general path. It is now a significant innovation to the state of the art to include direction-indicating elements 104 integral to the fiber to completely define, for example, an escape path. Elements 104 consist of several sections of illuminating fiber 106 of different lengths interrupted by elements of non-illuminating fiber zones 108. The non-illuminating fiber zones 108 may also vary in length. Together, these zones form a pattern that provides an unmistakable indication of direction. A novelty of the system is the fact that the directional elements and the light diffusion sites are integral to the fiber itself. They are not added after the fiber is manufactured.

Two general types of illuminating fibers are contemplated by the present invention. The first type consists of a regularly interrupted illuminating fiber, such as that described in FIG. 1, where the direction indicating elements follow each other in a predefined regular scheme. These types of fibers can be manufactured in significant quantities and are applicable in areas such as cinemas and airplanes. The paths do not include complicated bends or narrow elements and a direction-indicating element in regular periodical distances suffices to fulfill the targeted goal.

The second type would be useful in environments that require a much higher degree of safety, such as oil platforms, sport stadiums, or chemical factories. The present invention contemplates a tailored fiber where the direction indicating elements must be visible at points where two or more paths join, where corridors end, or where the route becomes very complex. Tailored fibers require a much higher degree of manufacturing skill. Details of the environment, including the light source, must be well known and contribute to the design process. No prior art processes are capable of producing the detailed fibers of commercially continuous lengths required for applications envisioned for the present invention.

Optical fibers used for the applications addressed by the present invention show a different behavior than conventional fibers, because their optical loss is not minimized but is well defined over the length of the fiber. The optical loss and illumination created thereby is realized by manufacturing the fiber in such a manner that a certain amount of light is coupled out of the fiber's radiation guiding core and is diffused into the fiber cladding, from where it is scattered or escapes, so the fiber cladding appears to be illuminated and the fiber itself is then placed along the escape path. This can be achieved in several ways.

One method is to chemically treat the optical fiber while it is still uncoated so that the core's surrounding cladding becomes rough and thus diffuses a certain portion of the light being totally reflected at the core/cladding interface. Another method utilizes the scattering effect of several substances added to the basic material from which the fiber is manufactured. High power laser etching and ion implantation are also means to produce light diffusing sites in an optical fiber.

Another method for producing such fibers is to provide a mechanically strippable outer jacket or cladding. The fiber itself may be consistently illuminating, such as diffusing radiation along its entire length to produce a relatively low illumination along the entire fiber. Illuminating sections can be controllably placed by stripping away an outer jacket or cladding to allow a greater amount of radiation to be diffused from the fiber. This produces periodically positioned highly illuminating sections.

A preferred method for producing the fiber central to the present invention is described in co-pending U.S. patent application Ser. No. 10/022,053 for "Partially Diffusing Optical Fiber", which is incorporated by reference in its entirety.

In that invention, an apparatus and method are provided to manufacture optical fiber in a way that produces controlled and patterned diffusion of optical radiation along its length. The novelty of the described invention is that the patterns of diffusion are produced at the time the optical fiber is manufactured. This "in-line" manufacturing method avoids the need for post-production treatment of the fiber, which makes the process highly efficient and economical. Light diffusing optical fibers of significant length can be produced.

Figure 2:
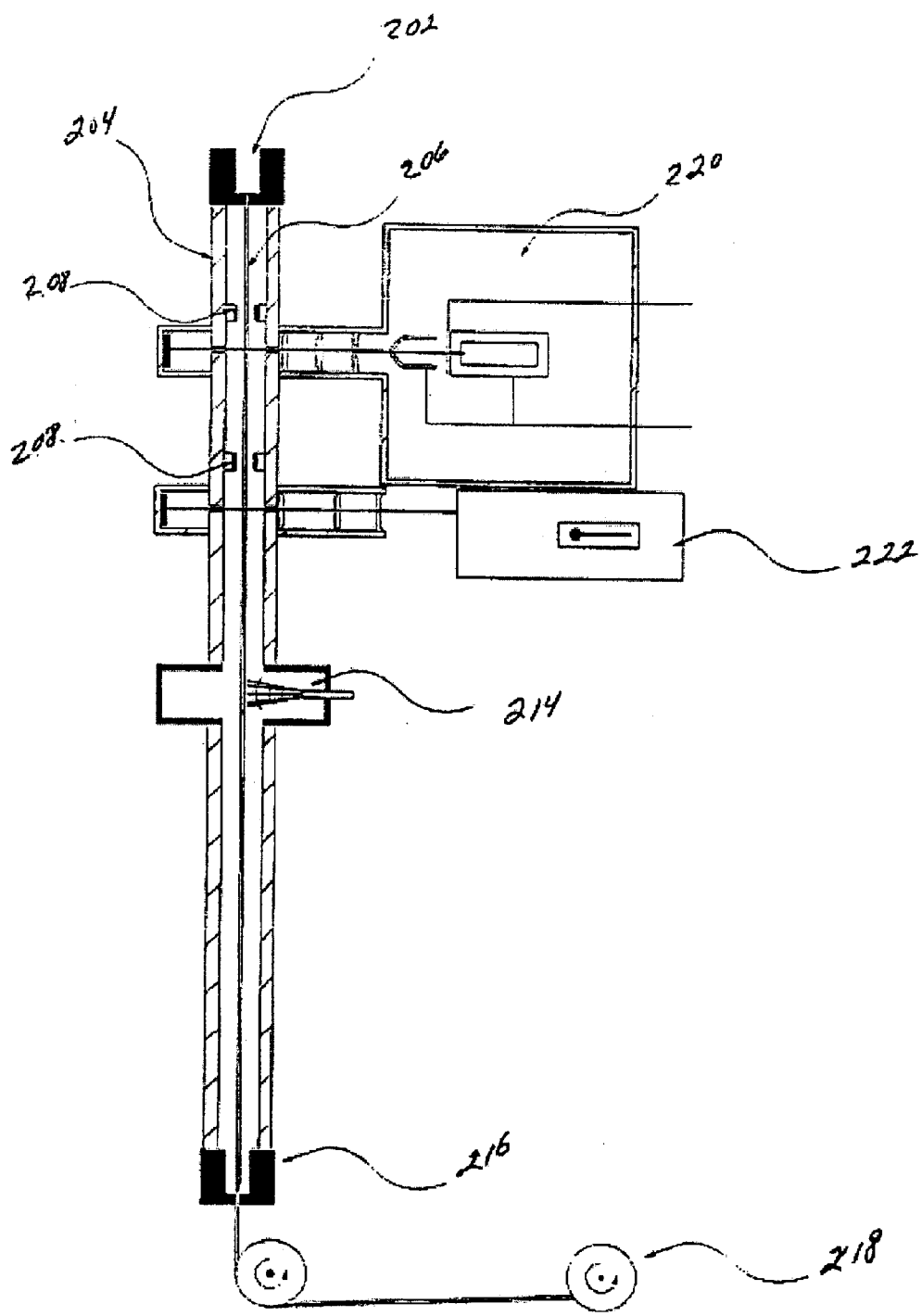
FIG. 2 illustrates a preferred method for producing partially diffusing fibers.

In a preferred embodiment, several fiber enhancement or modification methods are brought in-line to produce a continuous length of partially diffusing optical fiber. FIG. 2 illustrates the general setup of a preferred apparatus for producing partially diffusing optical fibers. The starting point is oven 202 from which a preform is drawn to produce optical fiber 206. Clean tube 204 may be used to protect fiber 206 from contamination. Tube 204 also maybe evacuated to allow various process steps for the fiber manufacturing. Heating elements 208 can be used to modify the diameter of fiber 206 for each unit length element. Heating elements 208 further serve to prepare fiber 206 for modification by ion-implanter 220 or laser 222. Vapor unit 214 serves to generate a second cladding if desired, or may be used to otherwise chemically treat fiber 206. This second cladding can fulfill scattering operations or contribute to higher fiber performance in general. Processes for fiber enhancement may also be included or repeated after the vapor-coating step. Finally, fiber 206 is provided with a polymer coating by coating means 216. The polymer must be appropriately chosen in order to withstand the scattered radiation and to enhance the fiber flexibility. Polymer-coated partially diffusing fiber 218 of commercial lengths can then be prepared for end use.

Other types of chemical treatment devices, such as sprayers and surface deposition devices may also be included as described. Abrasion devices may also be included in the process after the fiber has cooled, but before the protective polymer coating has been applied.

The emergency illuminating system described in the present invention can be powered by any number of conventional sources, such as end-pumping of the optical fiber or fibers by lasers or diodes. In one embodiment, a preferred light source is a fiber laser. A preferred fiber laser device is described in co-pending U.S. patent application Ser. No. 10/202,990 for an "Improved Fiber Laser Pumping Device", which is incorporated by reference in its entirety.

That invention provides an improved method and device to pump fiber lasers. A fiber laser is bent into a coil having a moderate curvature so as to avoid radiation losses. An outer cladding is partly polished to produce coupling surfaces on an inner cladding along the length of the spring-like coil. Radiation emitters are imaged with part of a micro lens that is attached to the coupling surface. In a preferred embodiment of the fiber laser, banks of high power laser diodes are utilized as pump sources. Coupling surfaces are preferably created at intervals along the length of the fiber at intervals where pump radiation from the previous pump edge has been absorbed. Although the invention may be used to pump single mode fibers, the preferred application is to pump multimode fibers, having greater core diameters and higher luminescent capacity. When a core dopant is included that converts infrared to visible wavelengths, the device is particularly useful as a light source for homogeneously illuminating and partially illuminating fibers that diffuse light along their lengths.

When fiber core diameter is selected to propagate a single mode, the core diameter is typically restricted to about 10–12 microns. It is generally very difficult to introduce significant activation energy into such a small area, especially for visible light. The present invention offers a solution to this problem. Because the applications described in the present invention do not include conventional output surfaces at the end of the fiber laser, a fiber could be pumped from the sides, or even at both ends. In this way, the fiber could be pumped at various locations, ensuring that sufficient activation energy is supplied along the entire length of the fiber.

Multimode cores have greater illuminating capacity than single mode cores, and are preferred in some of the applications considered for the present invention. A number of types of light sources could be coupled into such fibers, depending on the power density requirements of the application. For example, where different colors are coupled into one or more fibers so that such colors could be used to convey information, one or more light emitting diodes might be preferred sources. Since multimode fibers must be pumped with greater power than a single mode fiber to obtain useful power densities, in certain embodiments high power laser diode sources are frequently used as the illumination source. The use of laser diodes as a light source is advantageous due to the relatively high power of the laser light. A concern when using laser diodes as a light source is that the radiation is not rotationally symmetrical. The angle of dispersion parallel to the mounting surface is smaller than that perpendicular. The light beam does not diverge as quickly in the direction parallel to the mounting surface compared to the divergence of light perpendicular to the surface. If an optical system, such as a lens, is not used to focus the light energy, part of the energy will not be coupled into the fiber and will be lost.

In a complex industrial environment, such as a chemical refinery, it is important for workers to know where evacuation paths are, and possibly more important for them to know which are still safe to use. Changing the illumination color of the evacuation path guides is an ideal method to communicate such status to a worker.

Sensors that monitor heat, smoke density or air quality are placed at critical points throughout an escape route. The sensor system is interfaced to a master controller that provides feedback to the illumination means, which subsequently modifies their output to produce a different illumination color. Normal safe conditions can be indicated by a first color such as green, cautious but passable conditions by a second color such as yellow, and unsafe passages by a third color such as red.

In most prior art, illumination color is achieved through the use of colored light bulbs, diodes, filters, and lenses or by additives to make a permanently colored fiber. Prior art illuminating safety guides do not provide an integrated means for changing the illumination color of an optical fiber. Several methods are now presented.

Figure 3:
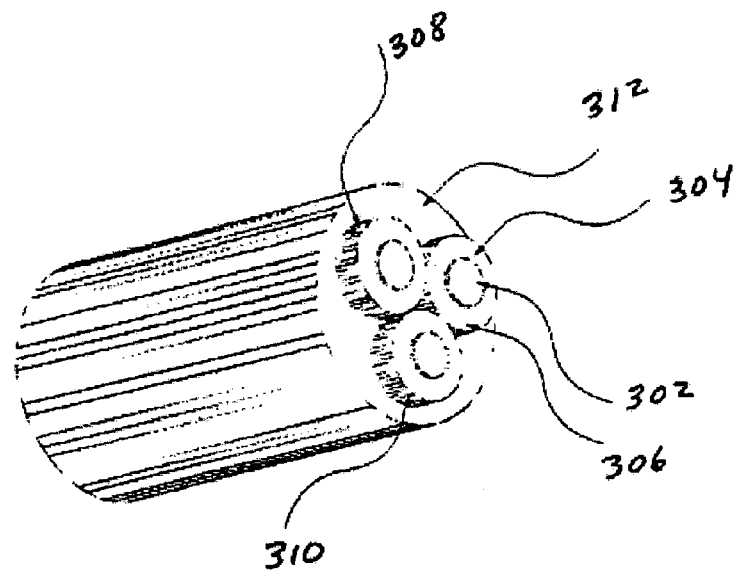
FIG. 3 is a cross-sectional view of an illuminating fiber having 3 inner fibers.

A preferred embodiment of the present invention consists of a multi-fiber integrated assembly where there are more than one inner fiber per fiber assembly and means are provided for individually illuminating each inner fiber. FIG. 3 shows a fiber setup with more than one inner core and fibers. As an example three fibers have been chosen. Each of these three inner fibers consists of core 302 and cladding 304. All three inner fibers 306, 308 and 310 are embedded in a single polymer jacket 312. It is best to start with separate fibers 306, 308 and 310 in order to simplify the coupling of radiation into the individual fibers and then combine them into a single fiber assembly kept by jacket 312. Since the separation between inner fibers 306, 308 and 310 is negligible, the final overall color of the fiber assembly will be a mixture of the different radiation of the inner fibers. Changing the radiation wavelengths of each inner fiber and the ability to manufacture illumination sites on the inner fibers having various intensities allows one to change the perceived color of the illumination sites.

Figure 4:
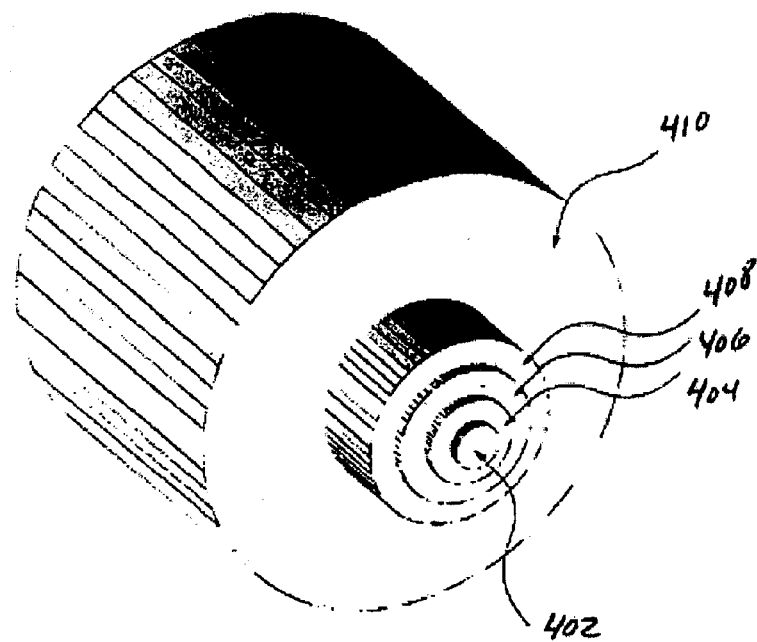
FIG. 4 is a cross-sectional view of an illuminating fiber having 3 inner claddings.

Another preferred embodiment utilizes the different guiding characteristics of radiation at different wavelengths. A fiber containing a core with several claddings is illustrated in FIG. 4. This fiber consists of a primary waveguide consisting of basic core 402 and primary cladding 404. Protective jacket 410, which may be made of gel or a polymer, is also provided in this embodiment. The parameters of this combination can be chosen in a way that only light of a wavelength lower than a certain critical "cut-off" wavelength is guided in this fiber's primary waveguide. A secondary waveguide consists of an effective secondary core comprising core 402 and primary cladding 404, and also consists of secondary cladding 406. The dimensions and refractive index of the secondary cladding 406 are chosen in order to reduce the cut-off wavelength for this fiber's secondary waveguide. The secondary waveguide can guide radiation having a longer wavelength than the radiation guided in the primary waveguide. The illumination colors guided in the inner and outer waveguides will blend to produce the illumination color of the overall fiber.

The same principal can be applied for even higher order waveguides, such as a ternary waveguide, having an effective core consisting of core 402, primary cladding 404, and secondary cladding 406, surrounded by ternary cladding 408. Since every waveguide contains different colors, the overall outer fiber will reflect the additive color of all the inner fiber wavelengths. Creating patterned diffusion sites along the length of the outer most cladding as previously described will produce illuminating color segments.

In another preferred embodiment of the present invention, the illuminating emergency system is able to produce an illuminated chasing effect. Light diffusing elements on the inner fibers of a multicore fiber assembly are staggered such that the light diffusion elements on the different inner fibers form sequential sets along the length of the outer fiber. By pumping the different inner fibers in a closely timed sequence, the diffusion elements will produce a chasing effect, or a fiber "pulse", that will emphasize a direction to be followed in an emergency.

In a further embodiment of the present invention, a plurality of inner fibers are incorporated into a fiber assembly to produce a traveling signal. This signal could be static, or could be made to appear to be chasing by staggering and pulsing the light source or sources. In this embodiment, an array of fibers, preferably in a two-dimensional ribbon array, contains fibers with diffusion elements that are staggered to produce a directional effect. By sequentially pulsing each fiber, one can create the appearance that a fiber "pulse" is traveling in a given direction along the fiber array, to illustrate the proper direction to follow. In another embodiment, such an array could be used as one approaches a corner, in that the array could produce the appearance of arrows pointing in a direction other than the axial direction of the fibers to alert users that they must soon change direction. As in the above embodiment, the individual fibers can be coupled to individual light sources, which can be staggered to produce a traveling effect along the diffusion elements to further emphasize the direction. Other fiber array configurations are contemplated, beyond that of a ribbon. Cylindrical fiber bundles are also contemplated, for example. A further embodiment could include caps or sleeves that slide or clip over each illuminating element. These caps could have arrow shaped light transmissive areas. As light is transmitted through the fiber or fibers, the arrow shapes are illuminated to provide directional information.

Figure 5:
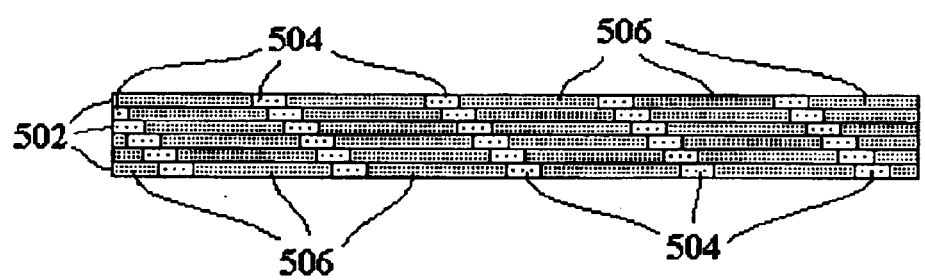
FIG. 5 illustrates three embodiments of directional lighting for providing a traveling signal in the present invention.
Figure 5:
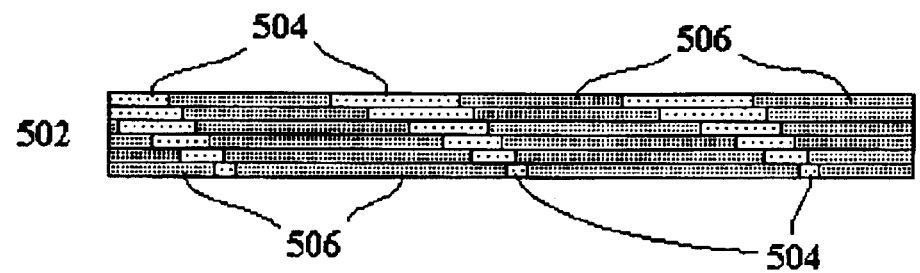
Figure 5:
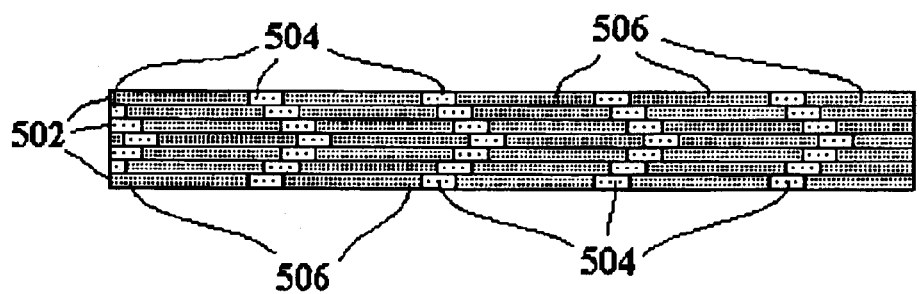

The above embodiment is illustrated in FIG. 5. An array of individual fibers 502 provides directional lighting in an emergency system. Uniformly illuminating elements 506 are formed in each fiber to provide a general illuminated path. Direction indicating elements 504 are periodically formed along the fiber to provide more detailed directional information. For example, in FIG. 5a, direction indicating elements 504 are formed along each fiber 502 to indicate the proper direction towards an exit or other destination. In one embodiment, the fibers are alternately pulsed to give the impression of a moving pulse of light. The pulse will appear to a person to move in a given direction. In another embodiment, direction indicating elements 504, which form a line pointing away from the directional axis of the fiber, is used to alert a person that a change in direction of the emergency pathway will soon occur. In this embodiment, the fibers may be pulsed or are constantly illuminated. Direction indicating elements 504 as shown in FIG. 5b become progressively shorter to give the appearance of distance and thus a more certain indicator of direction. In other embodiments, direction indicating elements 504 can be varied in length to give the impression of arrows or arrowheads, or arranged to give the impression of an arrow, as is illustrated in FIG. 5c. In all of these embodiments, individual fibers 502 can be attached to individual light sources and staggered pulses could be transmitted to give the impression of a traveling signal.

The application of a single illumination source lacks any means of redundancy, an extraordinarily important feature in safety systems. Redundancy can only be achieved by application of more than one system. A redundancy solution can be realized by utilizing a plurality of radiation sources coupled into the illuminating fiber at spatially separated positions along the fiber. Since it is physically difficult to couple radiation into a fiber that is already guiding radiation of the same wavelength without coupling out the radiation already guided, the fiber has to be interrupted at these amplification interfaces and the output from the incoming fiber has to be considered as one of the input sources for the outgoing fiber. In addition to the radiation from the outgoing fiber, a minimum of one, preferably several, radiation sources are suitably placed near the coupling point along with a suitable optical system. Only a certain number of the equivalently coupled radiation sources is in fact needed for the illumination process, the rest are in a stand-by position to ensure the reliability of the system. An electrical security circuit, preferably based on optical measurements, monitors the performance of the illumination fiber. When problems arise, the circuit reports to a central control system that activates the redundant radiation sources. An optical time domain reflectometer might also be used to measure the distance to any break in the optical fiber.

Figure 6:
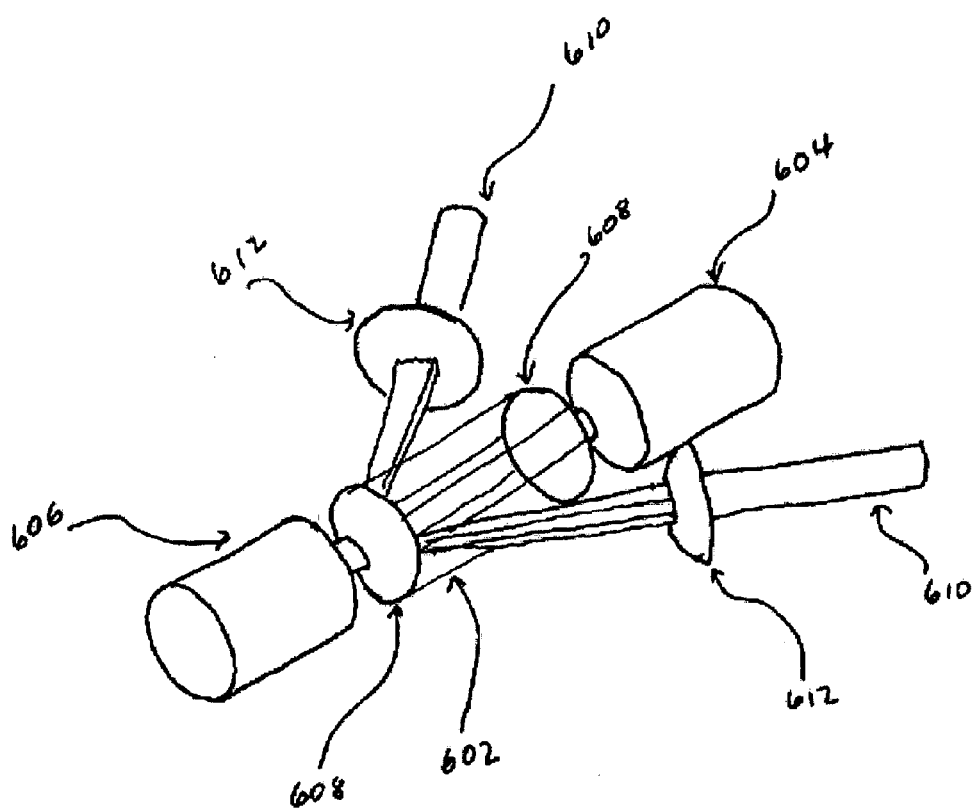
FIG. 6 illustrates a redundancy interface of the present invention.

A redundancy system as described above and in the following illustration is critical for some types of situations in which the present invention would be utilized. Often, in many of the areas where this invention would be used, a person must be directed to safety as quickly as possible. If an illumination source were to fail, parts or the whole system could fail to effectively direct people to safety. Additionally, the light emitted from the optical fibers may often be the only illumination available in an emergency situation. Failure of an illumination source could prove to be extremely dangerous for that reason as well. A preferred embodiment of a redundancy interface is illustrated in FIG. 6. Radiation 602 from primary incoming illuminating fiber 604 is coupled into the core of secondary fiber 606 by suitably designed optical system 608. Ideally both fibers have equivalent properties, especially concerning the numerical aperture. A 1:1 imaging optic ratio is a preferred setup, but other setups are possible and may be advantageous in special cases. Amplification/redundancy radiation from redundancy beam sources 610 is also coupled into secondary fiber 606. Optical system 612, which may be one or more lens to focus secondary radiation into fiber 606, is provided to efficiently couple the amplification/redundancy radiation into secondary fiber 606. A preferred choice for a beam source is a high power diode-laser. Since these sources are small, inexpensive and provide high quality power, more than one additional coupling can be realized. This embodiment provides two distinct advantages. First, it can enhance the amplification of the system and allow the use of lower power diode lasers. Second, it provides the required redundancy so that the system will continue to function if the one of the sources, especially the primary source, fails to function.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A directionally illuminating emergency system comprising:
   at least one illumination source;
   at least one continuously formed optical fiber containing at least one core;

means to couple radiation from said illumination source to said optical fiber; at least one cladding surrounding each said at least one core; and a plurality of longitudinally spaced illumination sections, wherein said longitudinally spaced illuminating sections are integral to said continuously formed fiber.

2. The directionally illuminating emergency system according to claim 1, wherein said longitudinally spaced illuminating sections have a repetitive direction-defining pattern.

3. The directionally illuminating emergency system according to claim 1, wherein said longitudinally spaced illuminating sections have a uniform illumination pattern.

4. The directionally illuminating emergency system according to claim 2, wherein said longitudinally spaced illuminating sections have a varying degree of out-coupling from said fiber such that illumination is longitudinally constant.

5. The directionally illuminating emergency system according to claim 1, wherein said optical fiber emits constant illumination along its length, and wherein said illumination sections are formed with means for periodically interrupting said illumination.

6. The directionally illuminating emergency system according to claim 1, further comprising elements for producing illumination in a plurality of colors and blends thereof.

7. The directionally illuminating emergency system according to claim 6, further comprising:

means to detect preselected environmental conditions; and control means connected to said detection means and said color producing elements, wherein said control means change said color emitted by said color producing elements to alert users of the safety of a path being illuminated.

8. The directionally illuminating emergency system according to claim 6, wherein said elements comprise a plurality of light-emitting diodes, wherein each said light-emitting diode emits radiation of a different color.

9. The directionally illuminating emergency system according to claim 1, wherein said illumination source is selected from a group consisting of at least one diode laser and at least one light-emitting diode.

10. The directionally illuminating emergency system according to claim 1, wherein said illumination source is at least one diode pumped fiber laser.

11. The directionally illuminating emergency system according to claim 10, further comprising means for coupling pump radiation into said fiber laser.

12. The directionally illuminating emergency system of claim 11, wherein said diode pumped fiber laser is shaped as a coil with a plurality of said coupling means positioned at preselected intervals along the length of said coil so that each single coupling means is positioned at a substantially identical point along each turn of said coil.

13. The directionally illuminating emergency system according to claim 1, further comprising at least one means to redundantly prevent illumination failure.

14. The directionally illuminating emergency system according to claim 13, wherein said means to redundantly prevent illumination failure comprises:

a number of equivalently coupled radiation sources in a standby position;

an electrical security circuit which optically monitors the performance of said illumination system; and a circuit that reports to a central control system that activates at least one equivalently coupled radiation source.

15. The directionally illuminating emergency system according to claim 1, further comprising a means to convert infrared fundamental radiation into visible illumination.

16. The directionally illuminating emergency system according to claim 1, wherein said illumination source comprises a coiled fiber laser having means for coupling pump-radiation along a length of said coiled fiber laser.

17. The directionally illuminating emergency system according to claim 1, wherein radiation is end-pumped into at least one fiber.

18. The directionally illuminating emergency system according to claim 1, wherein radiation is side-pumped into at least one fiber.

19. An optical fiber assembly having integral means to produce illumination in a plurality of colors and color blends thereof.

20. An optical fiber assembly comprising:

a primary waveguide comprising of a core and a primary cladding concentric with said core, wherein said primary waveguide can only transmit radiation with a wavelength less than a "cut-off" value;

a secondary waveguide comprising said primary waveguide as a complex core and a secondary cladding concentric with said primary waveguide, wherein said secondary waveguide can transmit radiation with a wavelength that is higher than said "cut-off" value of said primary waveguide;

wherein further said radiation from said primary waveguide and said radiation from said secondary waveguide are combined to produce specific colors or blends of colors.

21. An optical fiber assembly comprising a plurality of cores, inner claddings surrounding each of said cores to form inner fibers, and an outer cladding surrounding all said inner fibers thereby forming a single outer fiber wherein each said inner fiber is illuminated in a selected color and said outer fiber exhibits illumination in a blend of said selected colors.

22. The directionally illuminating emergency system according to claim 1, comprising:

at least two optical fibers arranged in a two-dimensional array; and a plurality of longitudinally spaced illumination sections, wherein said illumination sections are placed longitudinally along said fibers, and wherein further said optical fibers are illuminated in an alternating pattern to provide the impression of a traveling signal in a direction along said fibers.

23. The directionally illuminating emergency system according to claim 1, comprising:

at least two optical fibers arranged in a two-dimensional array; and a plurality of longitudinally spaced illumination sections arranged along the length of each said fiber to give the impression of a direction other than an axial direction of said fibers.

* * * * *